United States Patent
Sugimoto et al.

(10) Patent No.: US 8,179,361 B2
(45) Date of Patent: May 15, 2012

(54) REFLECTOR AND BACKLIGHT DEVICE

(75) Inventors: Yasushi Sugimoto, Tsukuba (JP); Teruo Teshima, Chikusei (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 872 days.

(21) Appl. No.: 10/597,185

(22) PCT Filed: Jan. 14, 2005

(86) PCT No.: PCT/JP2005/000344
§ 371 (c)(1),
(2), (4) Date: Aug. 19, 2008

(87) PCT Pub. No.: WO2005/068900
PCT Pub. Date: Jul. 28, 2005

(65) Prior Publication Data
US 2008/0297459 A1 Dec. 4, 2008

(30) Foreign Application Priority Data
Jan. 15, 2004 (JP) ................................. 2004-007950

(51) Int. Cl.
*G06F 3/033* (2006.01)
(52) U.S. Cl. ....................................................... 345/102
(58) Field of Classification Search .................... 349/65; 345/102
See application file for complete search history.

(56) References Cited

U.S. PATENT DOCUMENTS

| | | | |
|---|---|---|---|
| 5,961,198 A | 10/1999 | Hira et al. | |
| 6,667,782 B1 | 12/2003 | Taira et al. | |
| 2002/0036729 A1* | 3/2002 | Ohkawa | 349/65 |
| 2002/0145593 A1* | 10/2002 | Boyd et al. | 345/173 |
| 2002/0154087 A1* | 10/2002 | Katsu et al. | 345/102 |
| 2002/0180711 A1* | 12/2002 | Umemoto et al. | 345/173 |
| 2006/0007098 A1* | 1/2006 | Tong et al. | 345/102 |

FOREIGN PATENT DOCUMENTS

| | | |
|---|---|---|
| CN | 1291729 A | 4/2001 |
| JP | 07-225320 A | 8/1995 |
| JP | 10-068947 A | 3/1998 |
| JP | 11-064641 | 3/1999 |
| JP | 11-142630 | 5/1999 |
| JP | 11-231315 | 8/1999 |
| JP | 2002-040420 | 2/2002 |
| JP | 2003-187620 A | 7/2003 |
| TW | 407216 B | 10/2000 |
| TW | 557344 B | 10/2003 |

OTHER PUBLICATIONS

Office Action issued in European Application No. 05 703 583.4, dated Dec. 2, 2009.
Office Action issued in counterpart Chinese application No. 2005800024433.

(Continued)

*Primary Examiner* — Quan-Zhen Wang
*Assistant Examiner* — Tony Davis
(74) *Attorney, Agent, or Firm* — Griffin & Szipl, P.C.

(57) ABSTRACT

A back light device realizing improvement in hotspots and bright line in the region of light incidence and of darkness arising in between light sources is provided by forming the reflective surface of the reflector as a structured face comprising an iteration of prism elements of trapezoidal section.

16 Claims, 12 Drawing Sheets

OTHER PUBLICATIONS

International Search Report issued in corresponding application No. PCT/JP2005/000344 completed Apr. 4, 2005 and mailed Apr. 19, 2005.
Office Action issued in Korean Application No. 10-2006-7015619, dated Feb. 1, 2011.
Office Action issued in corresponding Taiwanese Application No. 10020301710, dated Apr. 14, 2011 and its English translation.
Office Action issued in a corresponding Taiwanese Application No. 10020874360, dated Sep. 28, 2011 and its English translation.
Office Action issued in corresponding Japanese Application No. 2005800024433, dated Jun. 21, 2011 and its English translation.
Office Action issued on Dec. 7, 2011 in corresponding Korean Patent Application No. 10-2006-7015819.

* cited by examiner

FIG. 1
PRIOR ART
(a)
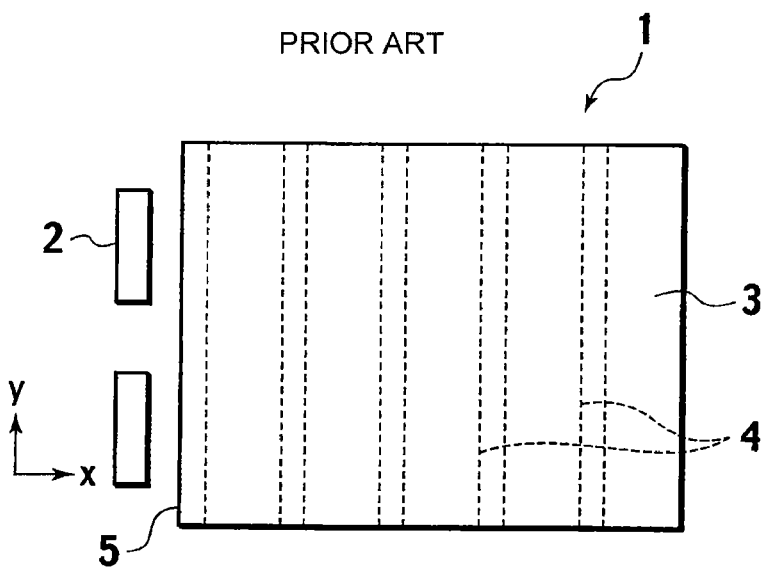
(b)
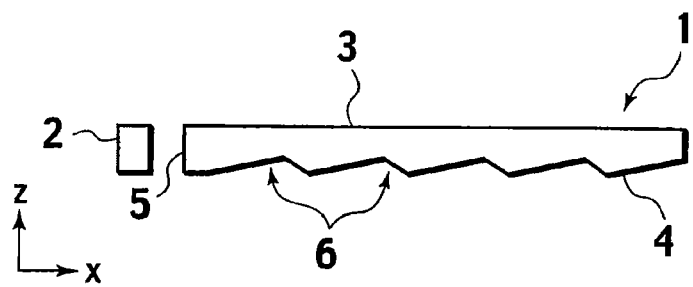
(c)
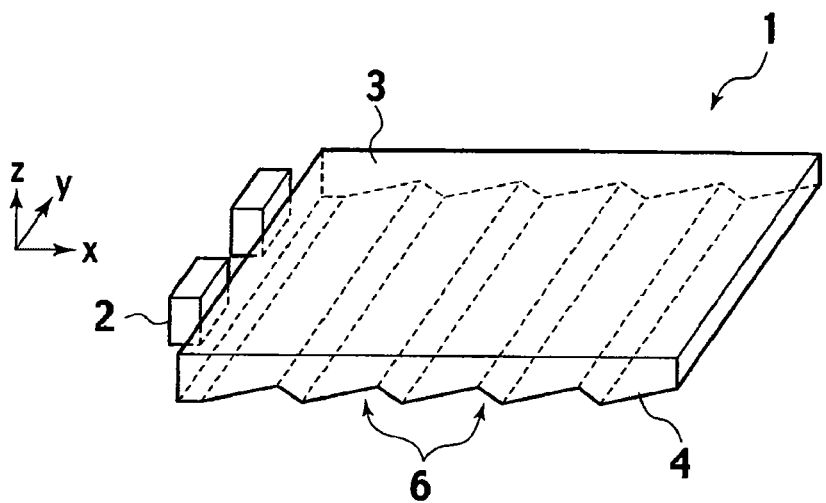

FIG. 4
(a)
(b)
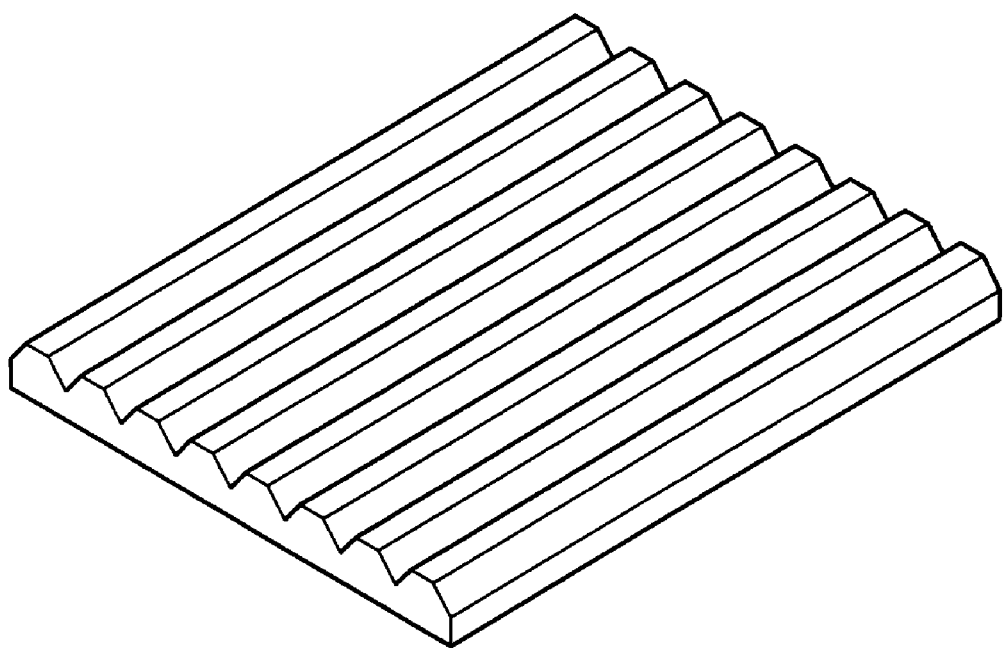

FIG. 5
(a)
(b)
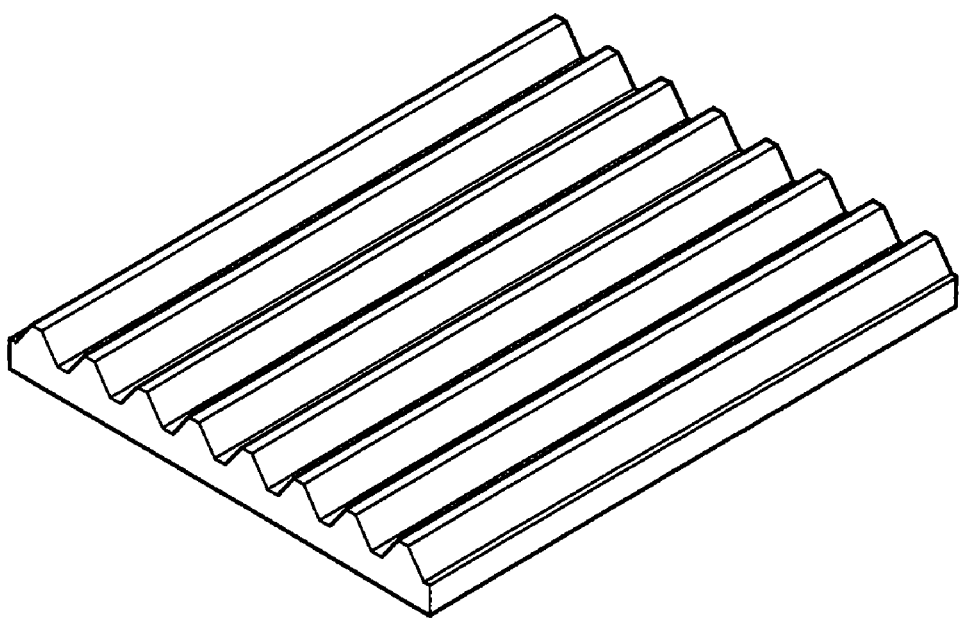

FIG. 6
(a)
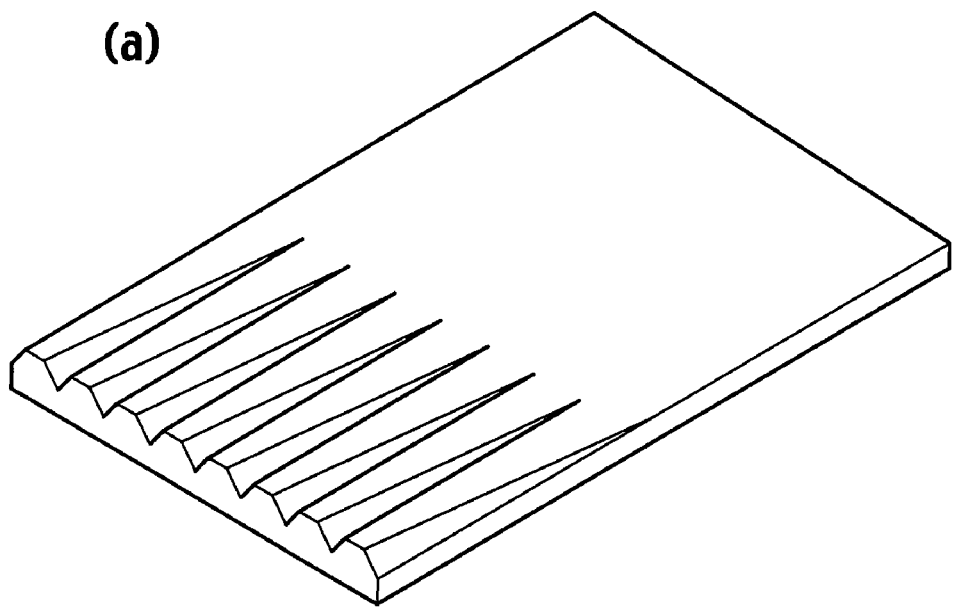
(b)
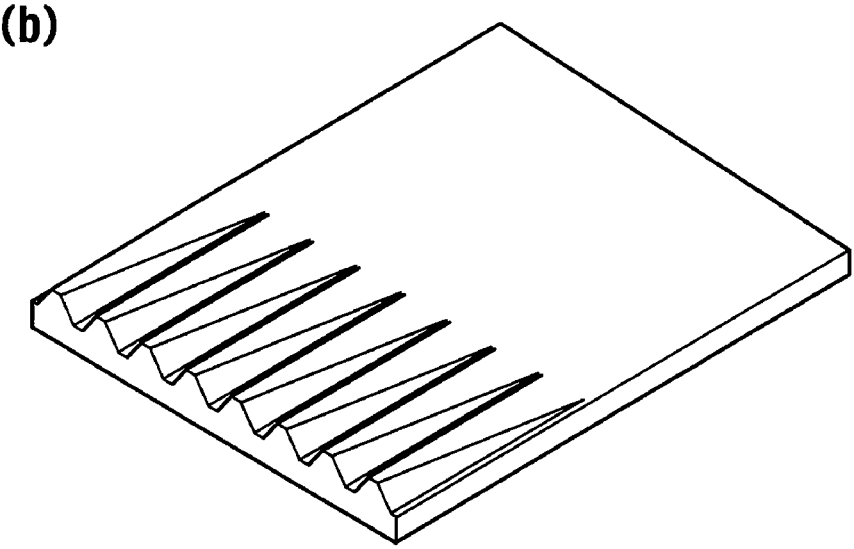

LED SIDE VIEW

SIDE ELEVATIONAL VIEW

FIG. 14
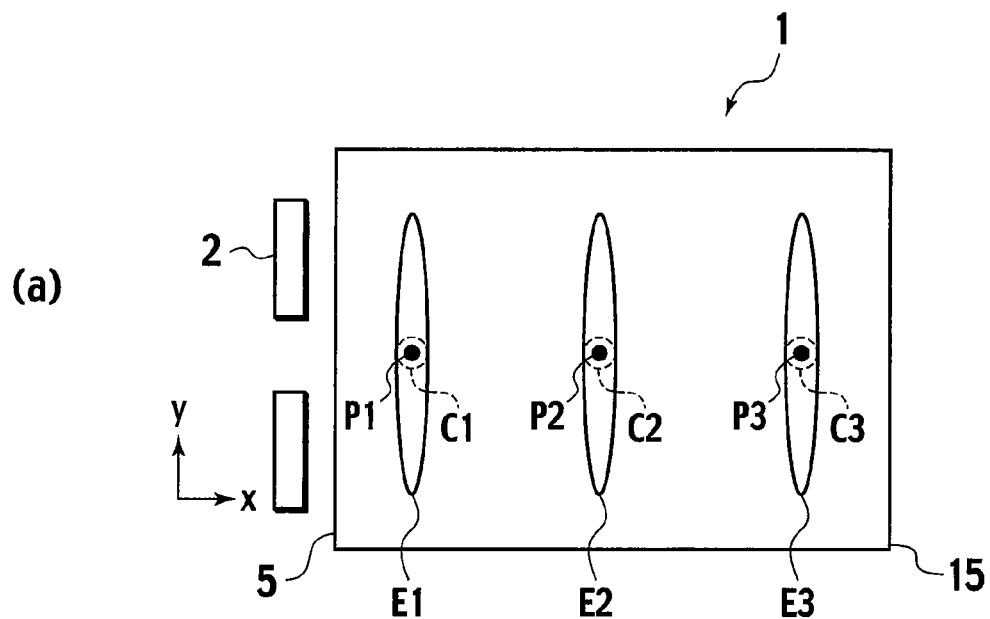
(a)
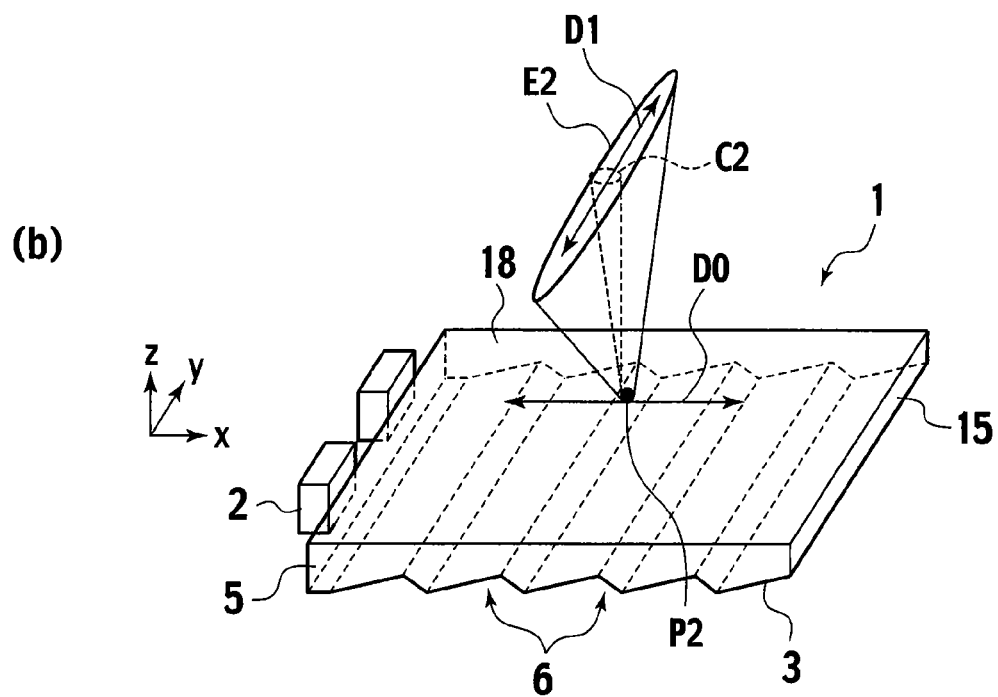
(b)

REFLECTOR AND BACKLIGHT DEVICE

This is a National Phase Application in the United States of International Patent Application No. PCT/JP2005/000344 filed Jan. 14, 2005, which claims priority on Japanese Patent Application No. 2004-007950, filed Jan. 15, 2004 The entire disclosures of the above patent applications are hereby incorporated by reference.

TECHNICAL FIELD

The present invention relates to a reflector and a backlight device employing this reflector.

BACKGROUND ART

The technology conventionally provided for illuminating a liquid crystal display device such as a mobile telephone or the like consists of a light guide plate that guides light emitted from a light source to a liquid crystal display device and a backlight device providing this light guide plate, that illuminates a liquid crystal display device from the rear.

FIG. 1 provides a perspective view, showing the external appearance of a conventional light guide plate. Light sources of light emitting diodes 2 are shown in FIGS. 1(a), (b) and (c). Here, the light guide plate 1 is made of a transparent material such as PMMA or polycarbonate or the like, and has a substantially flat, planar form. The light guide plate has an upper face constituting an exit face 3 and a lower face constituting a reflective face 4, while one of the side faces provides an entry face 5. The reflective face 4 has reflective elements 6 formed thereon that reflect light entering from the entry face 5 toward the exit face 3.

Light emitted from the light sources 2 enters the light guide plate 1 from the entry face 5 and is reflected at the reflective elements 6 formed on the reflective face 4, being deflected in the direction of the exit face 3, before being emitted from the exit face 3. The light guide plate 1 in which light entering from the entry face 5 comprising one of the side faces is emitted from the exit face 3 comprising the main face, is known as a side edge type and is widely used for mobile telephones and the like.

FIG. 2 provides a cross-sectional view depicting the usage of a conventional light guide plate and backlight device. The light guide plate 1 is disposed directly under the liquid crystal display device 7, such that the entry face 3 opposes the lower face 9 of the liquid crystal display device 7 with the optical sheet 8 disposed between that exit face 3 and lower face 9. Light emitted from the light emitting diodes 2 is incident to the light guide plate 1 from the entry face 5.

This light entering the light guide plate 1 from the entry face 5 is deflected at the reflective elements 6 formed on the reflective face 5 that opposes the exit face 3, reflecting upward in the direction of the liquid crystal display device 7 and exiting from the exit face 3.

Light exiting from the exit surface 3 of the light guide plate 1 enters the lower face 9 of the liquid crystal display device 7 via the optical sheet 8. This optical sheet 8 points the light exiting from the light guide plate 1 upward in the direction of the liquid crystal display device 7 such that the light enters the lower surface 9 of the liquid crystal display device 7 vertically.

A reflector 10 that reflects light emitted from the reflective face 4 is disposed at the side closer to the reflective face 4 of the light guide plate 1. The reflective surface of the conventional reflector 10 is a pure, mirror surface.

DISCLOSURE OF THE INVENTION

In the conventional art, light emitted from the light sources 2 enters the light guide plate 1 from the entry face 5, however light rays from the diode point light sources spread out in a fan shape as they are guided inside the light guide plate 1 and darkness arises between the light sources 2 in the vicinity of the entry face 5 of the light guide plate 1 due to these point light sources.

Light from the light sources 2 easily gives rise to pulsating shades of light or eyeball like glows called hotspots or bright line in the region of the entry face 5 due to the intensity of the light emitting diode light rays.

Accordingly, while a process of trial and error has been applied to the design of the form of the light emitting diodes 6, as light rays reflected and deflected are emitted directly from the exit face 3 of the light guide plate 1 and pass via the optical sheet 8 while traveling to the liquid crystal display device 7, a problem arises, as shown in FIG. 3, with the occurrence of bright hotspots 11, bright line 12 and darkness 13 due to insufficient distribution of light rays between the light sources 2.

The present invention provides a reflector and a backlight device employing this reflector that solves these problems.

In order to solve the above problems, in the reflector related to the present invention the reflection face includes a structured face structured from an iteration of prism elements having a trapezoidal section. It is preferable that the height of the trapezoidal section of the prism elements be uniform. It is preferable that a metallic layer of silver, a silver alloy or aluminum or the like be formed on the surface of the structured face of the reflector in order to increase the reflectivity. Further, it is preferable that a protective layer of a transparent metallic oxide material or resin be formed on the surface of the metallic layer to provide improved durability.

The backlight device related to the present invention is a backlight device having a light guide plate for propagating, reflecting and diffusing light, disposed at the rear surface side of a display device, a light source disposed at the end at at least one side of the light guide plate, and a reflector for reflecting light from the light guide plate disposed at the lower face of the light guide plate, wherein the reflective surface of the reflector includes a structured face structured from an iteration of prism elements having a trapezoidal section.

The height of the sections of the prism elements should be preferably uniform. Moreover, this height of the sections of the prism elements should preferably be progressively decreasing. It is preferable that the crest line direction of the prism elements be a direction vertical to the surface closer to the light source of the light guide plate. It is further preferable that the light guide plate provides reflective elements formed integrally with the surface thereof adjacent to the liquid crystal display device, and that light rays be emitted from these reflective elements in the direction of a reflector adjacent to the light guide plate face opposing the side of the light guide plate closer to the liquid crystal display devices.

Moreover, it is preferable that in order to further improve the problems of hotspots or bright line, or of darkness that occurs between the light sources, that an anisotropic diffusion pattern be formed on the face of the light guide plate opposing the face on which the reflective elements are integrally formed. Again, it is preferable that this anisotropic diffusion pattern diffuses the greater part of light in the direction between the light sources, and the lesser part of the light in the direction of a anti-entry part. Further, it is preferable that the anisotropic diffusion pattern be an uneven pattern formed from a surface relief hologram.

Because the reflective surface of the reflector is changed from what was simply a mirror surface in the conventional art to a structured face structured from an iteration of prism elements having a trapezoidal section, light emitted from the reflective surface of the light guide plate can be reflected in a direction different to the direction of reflection from the purely mirror surface. This reflected light reenters the light guide plate, and finally enters the liquid crystal display device via the optical sheet, however, as light reflected in a direction different to the direction of reflection of the purely mirror surface is added, an improvement can be realized in the problems of darkness occurring between the light sources and of hotspots and bright line occurring in the region of light input affecting the conventional technology.

Thus, a backlight device is realized having a decrease in darkness occurring between the light sources and of hotspots and bright line occurring in the region of light input, that realizes less unevenness and improved uniformity of luminance.

BRIEF DESCRIPTION OF THE DRAWINGS

FIG. 1 shows a light guide plate, FIG. 1(a) providing a plan view, FIG. 1(b) providing a front view and FIG. 1(c) providing a perspective view;

FIG. 4 shows an embodiment of a reflector according to the present invention;

FIG. 5 shows an embodiment of a reflector according to the present invention;

FIG. 6 shows an embodiment of a reflector according to the present invention;

FIG. 14 is an explanatory drawing that illustrates the properties of the hologram, FIG. 14(a) providing a plan view showing the strength of angle dependency of light emitted from the points P1, P2 and P3 of the exit face 12 of the light guide plate and FIG. 14(b) providing a perspective view showing, three dimensionally, the strength distribution of light emitted from the point P2 of the exit surface 11 of the light guide plate 10;

BEST MODE FOR CARRYING OUT THE INVENTION

Figure 2:
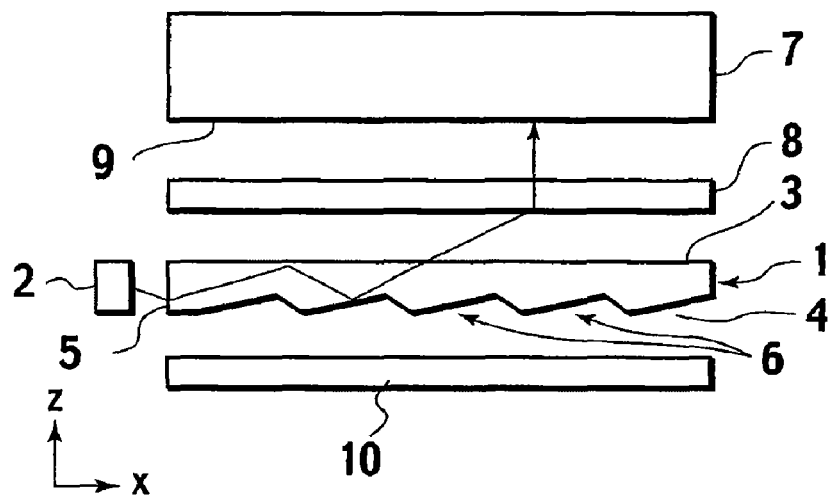
FIG. 2 shows the structure of a conventional backlight device.
Figure 3:
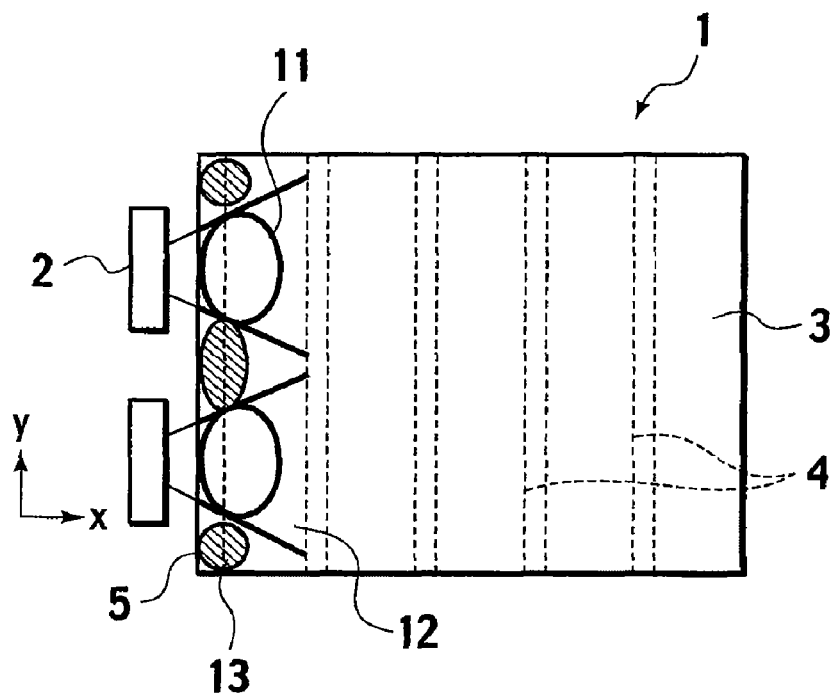
FIG. 3 shows hotspots or bright line occurring in the light input region and darkness occurring between the light sources in a conventional backlight device.

The reflector and backlight device related to the present invention will now be described with reference to the drawings.

For simplicity, in these drawings, like reference numerals identify like elements. Further, the drawings of the embodiments of the present invention are provided in order to illustrate the content of the invention but are not intended to accurately reflect the relative proportions of each of the parts.

To enable ease in referencing, an orthogonal xyz coordinate system is set over some of the drawings. The x-axis and the y-axis are set in the two regions of the upper face and the lower face of the light guide plate in the direction of travel of light in the light guide plate, and the z-axis is set in the direction of the normal to the exit face. Further, the positive and negative directions of the z-axis are termed upwards and downwards.

FIG. 4 shows an embodiment of a reflector according to the present invention. FIG. 4(a) provides a cross-sectional view and FIG. 4(b) a perspective view. With this embodiment, trapezoidal section prism elements are formed as a continuum with no gap opening between one prism element and another on the reflective surface of the reflector. As shown in FIG. 4(b), the height of the trapezoidal section of each prism element should be uniform. The length of the base of each trapezoid, that is to say, the repetition cycle of the prism elements should preferably be 1-200 μm, and more preferably still 10-100 μm. If this is less than 1 μm a spectral effect due to diffraction intensifies leading to a deterioration in the display capabilities of the liquid crystal display device while if it exceeds 200 μm the repetitive structure is visible from the liquid crystal display side. The angle formed by the oblique side of the trapezoid and the base should preferably be 20-70° and more preferably still 35-55°.

If that angle is less than 20° or greater than 70° there is a deterioration in the effect of improving the problems of hotspots or bright line in the light input region or of darkness between the light sources. The left and right base angles of each trapezoidal section may be even or different. The ratio of the length of the upper side to the length of the base (the repetition cycle of the prism elements) should preferably be 0.05-0.5 and more preferably still 0.1-0.3. If this is below 0.05 luminance deteriorates while if it exceeds 0.5 there is a deterioration in the effect of improving the problems of hotspots or bright line in the light input region or of darkness between the light sources. Further, the trapezoidal section of each prism element may be the same or different to the others.

Where the trapezoidal section is triangular shaped damage is easily sustained at the apex part leading to a defect and deterioration in display quality, but providing the trapezoid is advantageous by making such defects less likely to occur.

This structure of an iteration of prism elements of a trapezoidal section as shown in FIG. 4, can be obtained by applying a suitable thickness of ultraviolet cured resin on for example PET film, irradiating from the PET film side while pressing a mold of the appropriate form to the other side, then removal from the mold after hardening the ultraviolet cured resin.

It is preferable that a metallic layer of silver, a silver alloy or aluminum or the like be formed on the surface of the structured face formed of an iteration of prism elements of a trapezoidal section, in order to increase the reflectivity, silver or a silver alloy being especially preferable for this. The metallic layer can be formed by a deposition method or a sputtering method. It is preferable that the metallic layer be formed following the prism shape of the structured face. If the structured layer is made flat, there is a deterioration in the effect of improving the problems of hotspots or bright line in the light input region or of darkness between the light sources.

Further, an anchor layer should be formed between the structured face and the metallic layer to provide improved adhesiveness.

Further, it is preferable that a protective layer of a transparent metallic oxide material or resin be formed on the surface of the metallic layer to provide improved durability. This protective layer may be formed following the prism shaped form of the structured face or so as to make the structured face flat, however if this protective layer is formed following the prism shaped form, the effect of improving the problems of hotspots or bright line in the light input region or of darkness between the light sources is strongest, therefore this is more preferable.

The rate of reflectivity of the reflector should preferably be not less than 75% and not more than 80%. If this is less than 75% there is a decrease in the luminance of the backlight, also bright line becomes more prominent in the region of light entry.

FIG. 5 shows a second embodiment of a reflector according to the present invention, FIG. 5(a) providing a cross-sectional view and FIG. 5(b) a perspective view. For this embodiment trapezoidal section prism elements are formed as a continuum with a gap opening between one prism element and another on the reflective surface of the reflector. As shown in FIG. 5(b), the height of the trapezoidal section of each prism element should be uniform. The repetition cycle of the prism element should preferably be 1-200 μm, and more preferably still 10-100 μm.

If this is less than 1 μm a spectral effect due to diffraction intensifies leading to a deterioration in the display capabilities of the liquid crystal display device while if it exceeds 200 μm the repetitive structure is visible from the side of liquid crystal display. The angle formed by the oblique side of the trapezoid and the base should preferably be 20-70° and more preferably still 35-55°. If that angle is less than 20° or greater than 70° there is a deterioration in the effect of improving the problems of hotspots or bright line in the light input region or of darkness between the light sources.

The left and right base angles of each trapezoidal section may be even or different. The sum of the length of the upper side and the length of the gap between prism elements should preferably be a ratio in the range of 0.05-0.5 in relation to the repetition cycle of the prism elements and more preferably still 0.1-0.3. If this is below 0.05 luminance deteriorates while if it exceeds 0.5 there is a deterioration in the effect of improving the problems of hotspots or bright line in the light input region or of darkness between the light sources. Further, the trapezoidal section of each prism element may be the same or different to the others.

Where the trapezoidal section is triangular shaped damage is easily sustained at the apex part leading to a defect and deterioration in display quality, but providing the trapezoidal section is advantageous by making such defects less likely to occur.

Figure 7:
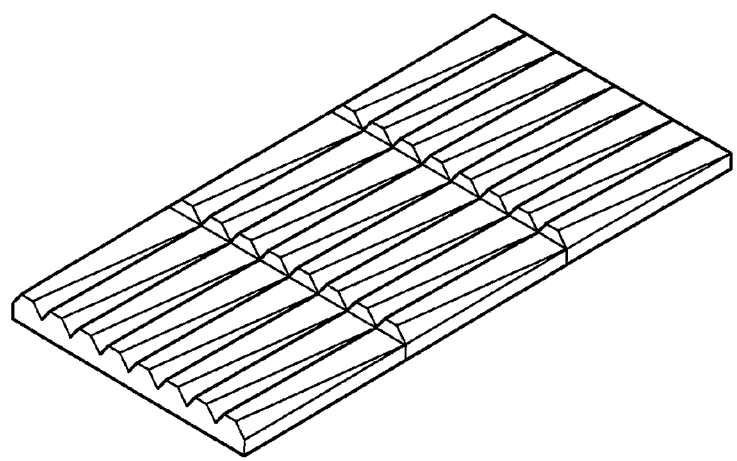
FIG. 7 shows an embodiment of a reflector according to the present invention.

FIG. 6 and FIG. 7 show a reflector according to a third embodiment of the present invention. For this embodiment the height of the trapezoidal section of the reflective surface of the reflector is formed by an iteration of prism elements, the height of triangular section of the prism elements decreases progressively. It is suitable if there is no gap between prism elements as shown in FIG. 6(a) or if there is a gap as shown in FIG. 6(b). Further the repetitive arrangement toward the crest line direction of the prism elements may have a single prism element arrangement or a plurality of the prism elements arranged in repetition as shown in FIG. 7.

Moreover, in the case of this embodiment, the preferable ranges for such things as the length of the base of the trapezoidal section, the repetition cycle of the prism elements, the angle of the oblique side of the trapezoidal section and the base, the ratio of the length of the upper side of the trapezoidal section to the length of the base, and the ratio of the sum of the length of the gaps between prism elements and the length of the upper side of the trapezoidal section are the same as the respective values applying for the first and second embodiments.

Further, in the case of the second and third embodiments also, in the same way as applies with respect to the first embodiment, the structured face can be obtained by applying a suitable thickness of ultraviolet cured resin on for example PET film, irradiating from the PET film side while pressing a mold of the appropriate form to the other side, then removal from the mold after hardening the ultraviolet cured resin.

Again, it is preferable that a metallic layer of silver, a silver alloy or aluminum or the like be formed on the surface of the structured face formed of an iteration of prism elements of a trapezoidal section in order to increase the reflectivity, silver or a silver alloy being especially preferable for this. The metallic layer can be formed by a deposition method or a sputtering method. It is preferable that the metallic layer be formed following the prism shape of the structured face. If the structured layer is made flat, there is a deterioration in the effect of improving the problems of hotspots or bright line in the light input region or of darkness between the light sources. Further, an anchor layer should be formed between the structured face and the metallic layer to provide improved adhesiveness.

Further, it is preferable that a protective layer of a transparent metallic oxide material or resin be formed on the surface of the metallic layer to provide improved durability. This protective layer may be formed following the prism shaped form of the structured face or so as to make the structured face flat, however if this protective layer is formed following the prism shaped form, the effect of improving the problems of hotspots or bright line in the light input region or of darkness between the light sources is strongest, therefore this is more preferable.

Figure 8:
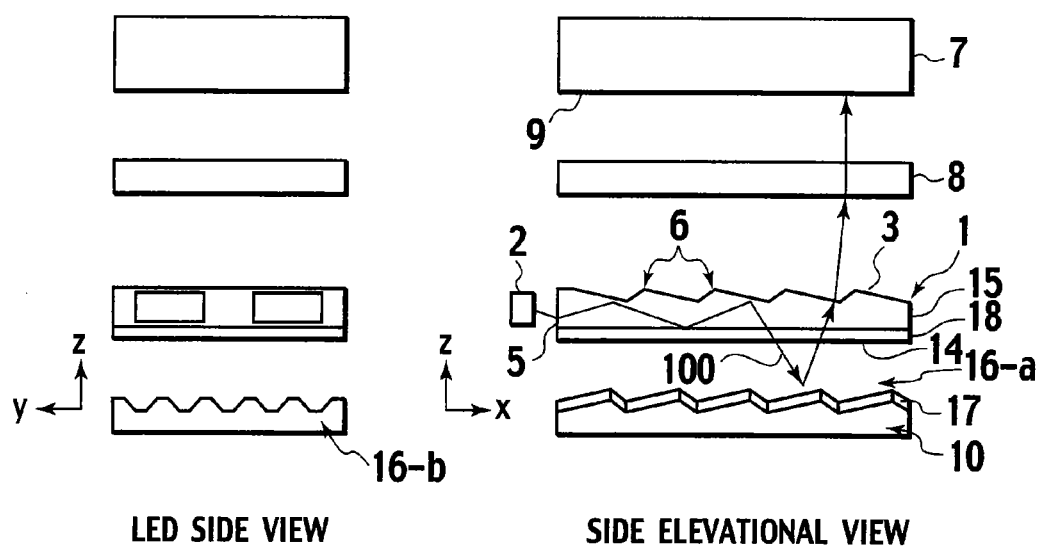
FIG. 8 shows an embodiment of a backlight device according to the present invention.

FIG. 8 shows an embodiment of a backlight device according to the present invention. This backlight device in FIG. 8 has the same cross-section as the backlight device of the figure described with relation to conventional technology.

The light guide plate 1 provides reflective elements 6 and an optical sheet 8 that is a prism sheet or the like, disposed between the light guide plate 1 and liquid crystal display elements 7. On the other hand, at the side opposite that side at which the optical sheet 8 of the light guide plate 1 is disposed, a reflector 10, having the structured face of this invention is provided. In FIG. 8 the reflective elements 6 of the light guide plate are disposed on the exit face 3, however these may also be provided to on the opposing face adjacent to the reflector 10.

Figure 9:
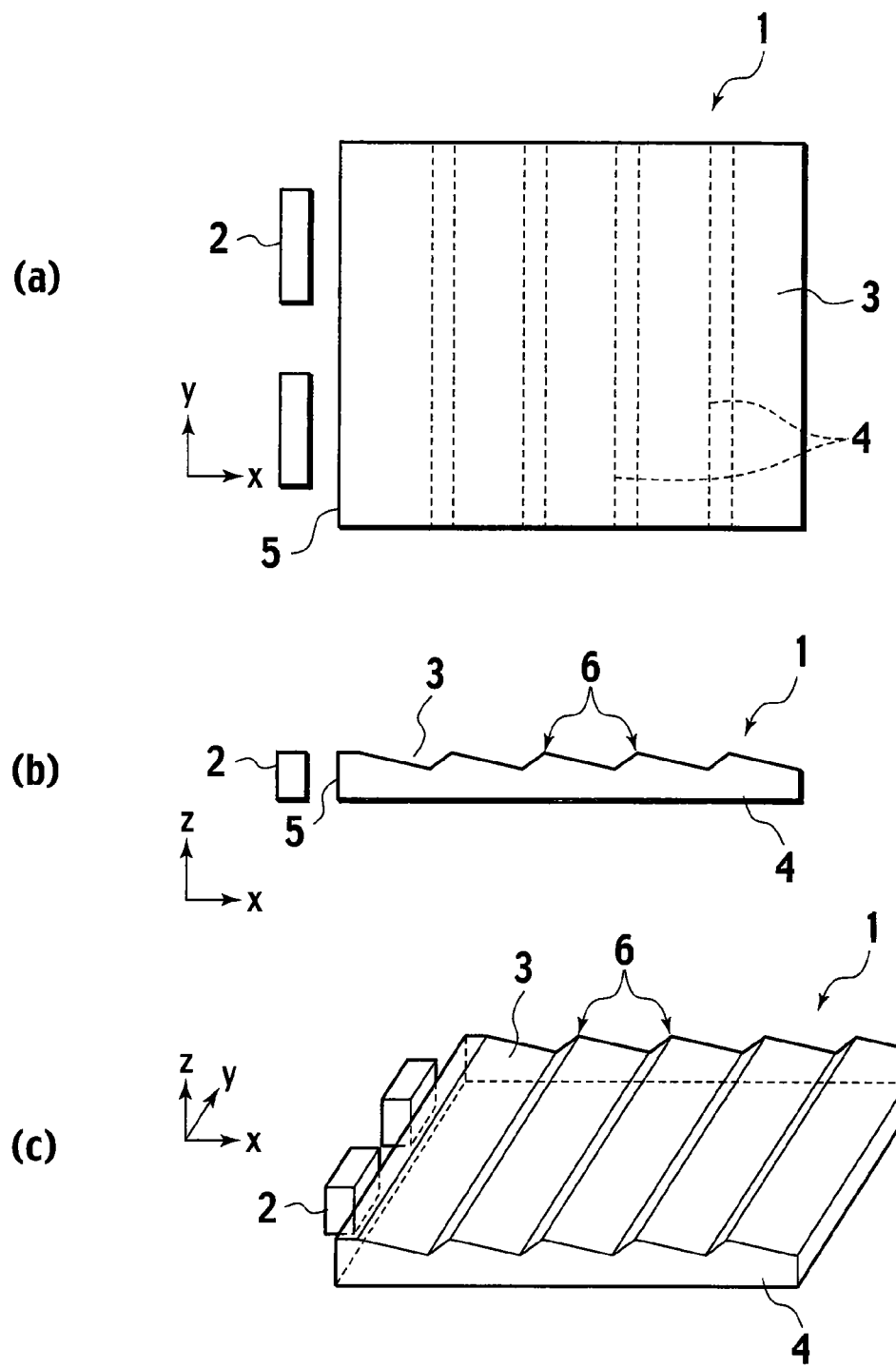
FIG. 9 shows the backlight device, FIG. 9(a) providing a plan view, FIG. 9(b) providing a front view and FIG. 9(c) providing a perspective view.

FIG. 9 shows the backlight device according to this embodiment, FIG. 9(a) providing a plan view, FIG. 9(b) providing a front view and FIG. 9(c) providing a perspective view. In those figures the light emitting diodes 2 light sources are shown.

Figure 11:
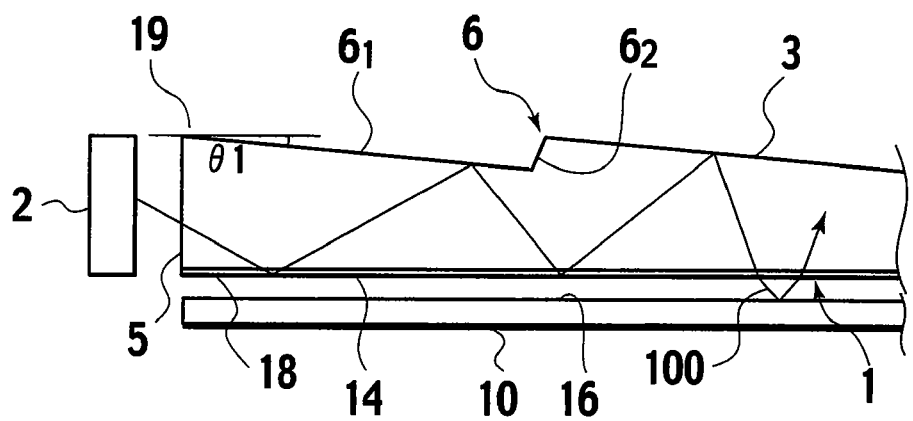
FIG. 11 shows the traveling direction of a light ray within the light guide plate.

As shown in FIG. 11, in the case of this embodiment the reflective elements 6 are integratedly formed with the exit face 3 at that side of the light guide plate 1 closer to the liquid crystal display device 7. Light rays 100 entering the light guide plate 1 from the light emitting diodes 2 in the xy plane are reflected and deflected in the z axial direction, a part of this light passing the face 14 opposing the entry face 3 and reaching the reflective 10.

It is suitable for this face 14 opposing the exit face 3 of the light guide plate 1 to be a mirror surface or a rough surface, but in the case of this embodiment a diffusion pattern integrated layer 18 capable of anisotropically diffusing light is integratedly formed with this face. The light guide plate 1 is comprised of a transparent material having a constant refractive index such as PMMA, polyolefine or polycarbonate, being of a substantially planar form having a substantially rectangular shaped upper face and lower face.

Referring to the above coordinate axis, the light guide plate 1 is formed with the upper face and lower face substantially parallel to the xy plane, these faces comprising respectively the exit face 3 and anisotropic diffusion pattern integrated layer 18, while between the exit face 3 and anisotropic diffusion pattern integrated layer 18, being the end face that enters light rays, is the entry face 5.

The reflective elements 6 are integratedly formed on the exit face 3. These reflective elements 6 discharge the role of reflecting the light entering from the entry face 5 and deflecting the light in the direction of the anisotropic diffusion pattern integrated layer 18. The reflective elements 6 are formed continuously or discontinuously from one of the side faces of the light guide plate 1 to the other, and a greater part of these elements are used for reflecting light. Accordingly, the exit face 3 on which are formed the reflective elements 6 of this embodiment have a high degree of efficiency in reflecting incoming light in the direction of the anisotropic diffusion pattern integrated layer 18 and improve the efficiency of usage of light by the light guide plate 1.

A hologram having anisotropic properties (anisotropic diffusion pattern) is formed on the anisotropic diffusion pattern integrated layer 18. This hologram is termed a surface relief hologram to distinguish it from a three dimensionally formed hologram. The hologram diffuses light emitted from the anisotropic diffusion pattern integrated layer 18 substantially in the direction between the light sources 2 and passes the light. Light rays that travel to the anti-entry face 15, that is the face opposing the entry face 5 are arranged so as to be diffused to a lesser degree. Light reflected at the reflective elements 6 is diffused substantially by the hologram in the direction between the light sources 2 in order to compensate for insufficient quantity of light rays occurring between the light sources 2, and light that is diffused in a substantially elliptical form is emitted from the anisotropic diffusion pattern integrated layer 18.

The light guide plate 1 having the form as described above can be produced by extrusion molding processes in a mold using a material such as PMMA, polyolefine or polycarbonate.

Figure 10:
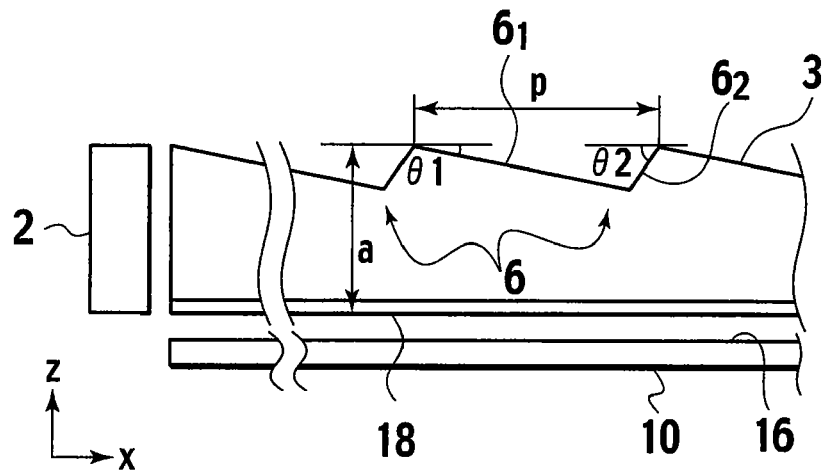
FIG. 10 shows a cross-section of the light guide plate.

FIG. 10 shows the dimensions of each part of the light guide plate.

The distance a between the exit face 3 and anisotropic diffusion pattern integrated layer 18 is generally determined by the type of the light sources 2, however, this distance should be within the range from 0.3-3.0 mm, preferably 0.4-1.0 mm and more preferably still 0.5-0.8 mm. The angle $\theta 1$ formed between the first face $6_1$ of the reflective elements 6 and the exit face 3 should be between 0.2-5°, preferably 0.3-3.0° and more preferably still 0.3-1.50. The angle $\theta 2$ between the second face $6_2$ of the reflective elements 6 and the exit face 3 should be not greater than 90°, preferably 30-89° and more preferably still 35-89°.

The interval p between neighboring reflective elements 6 should be uniform, and preferably within the range 50-500 μm, more preferably 50-250 μm and more preferably still 100-150 μm. Note that if the interval p is made uniform a moire phenomena arises due to interference from the cell arrangement of the liquid crystal display elements 7, therefore this interval can intentionally be made random.

FIG. 11 shows the traveling direction of a light ray within the light guide plate.

Light rays 100 incident to the entry face 5 of the light guide plate 1 from the light sources 2 travel inside the light guide plate 1 repeatedly undergoing total reflection between the anisotropic diffusion pattern integrated layer 18 and the exit face 3 until the angle between the traveling direction of the light and the anisotropic diffusion pattern integrated layer 18 reaches a critical angle.

The first face $6_1$ of the reflective elements 6 performs the role of deflecting light to be reflected in the direction of the anisotropic diffusion pattern integrated layer 18. Light the traveling direction of which forms a small angle with the exit face 3 entering the entry face 5 is deflected in the direction of the anisotropic diffusion pattern integrated layer 18 as it is reflected at the first face $6_1$ of the reflective elements 6, and when the angle of this traveling light and the anisotropic diffusion pattern integrated layer 18 exceeds a critical angle, the light is output from the anisotropic diffusion pattern integrated layer 18.

Here, to the extent that the angle $\theta 1$ formed between the first face $6_1$ of the reflective elements 6 and the anisotropic diffusion pattern integrated layer 18 is small, the light is gradually pointed upward due to reflection at the first face $6_1$ of the reflective elements 6, thus the direction of light output from the light guide plate 1 is collimated. The light thus arranged can be easily managed, but light extracted from the anisotropic diffusion pattern integrated layer 18 is further deflected by the reflective grooves 16 formed on the face of the reflector 10 and the metal deposition layer 17 formed on the face of the reflective grooves 16, and the light rays are reflected in the direction of the light guide plate 1 again.

These light rays are further diffused at the anisotropic diffusion pattern integrated layer 18 and are directed toward the exit face 3. At this time, as the traveling direction of the light rays is set to an angle below the angle for total reflection in relation to the faces of the anisotropic diffusion pattern integrated layer 18 and the reflective elements 6, light reflected from the metal deposition layer 17 and the reflective grooves 16 of the reflector 10 is emitted from the exit face 3 of the light guide plate 1. Light rays emitted from the light guide plate 1 undergo a determined deflection at the optical sheet 8 before entering the lower face 9 of the liquid crystal display elements 7.

In the light guide plate 1 of this embodiment the shape of the reflective elements 6 employs a V-shaped form as shown in FIG. 11.

The angle between the inclination of the reflective elements 6 and the exit face 3 ($\theta 1$) is 0.7°, the reflective elements 6 being disposed from the corner part 119 and the intersection of the entry face 5 at a constant pitch of 120 μm. As shown in FIG. 11 the mold for the light guide plate 1 is prepared having V shaped grooves such that the inclined face is directed to face the light sources 2 so that the angle of inclination brings light from the entry face 5 gradually to an angle below that angle for total reflection and the light guide plate is produced by extrusion processes using the mold.

It is preferable that a pattern that diffuses light the formed on the face 18 that opposes the reflective elements 6. In this case it is preferable that light is substantially diffused in the direction between the light sources 2 and diffusion in the direction between the reflective entry face 15 and the light sources be smaller, thereby realizing improved frontal luminance. For the light guide plate 1 according to this embodiment, the hologram formed by the anisotropic diffusion pattern integrated layer 18 diffuses substantially in the direction between the light sources 2 while the diffusion of light is smaller in the direction between the reflective entry face 15 and the light sources 2. Further, each of the half value diffusion angles use a pattern having 60° in the direction between the light sources and 1° in the other direction.

Figure 12:
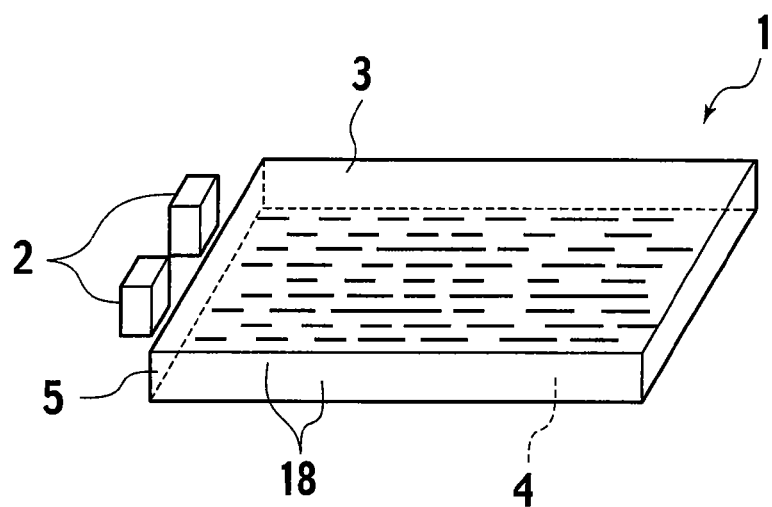
FIG. 12 shows the anisotropic diffusion hologram pattern integrally formed with the light guide plate.

FIG. 12 shows the anisotropic diffusion hologram pattern integrally formed with the light guide plate.

Figure 13:
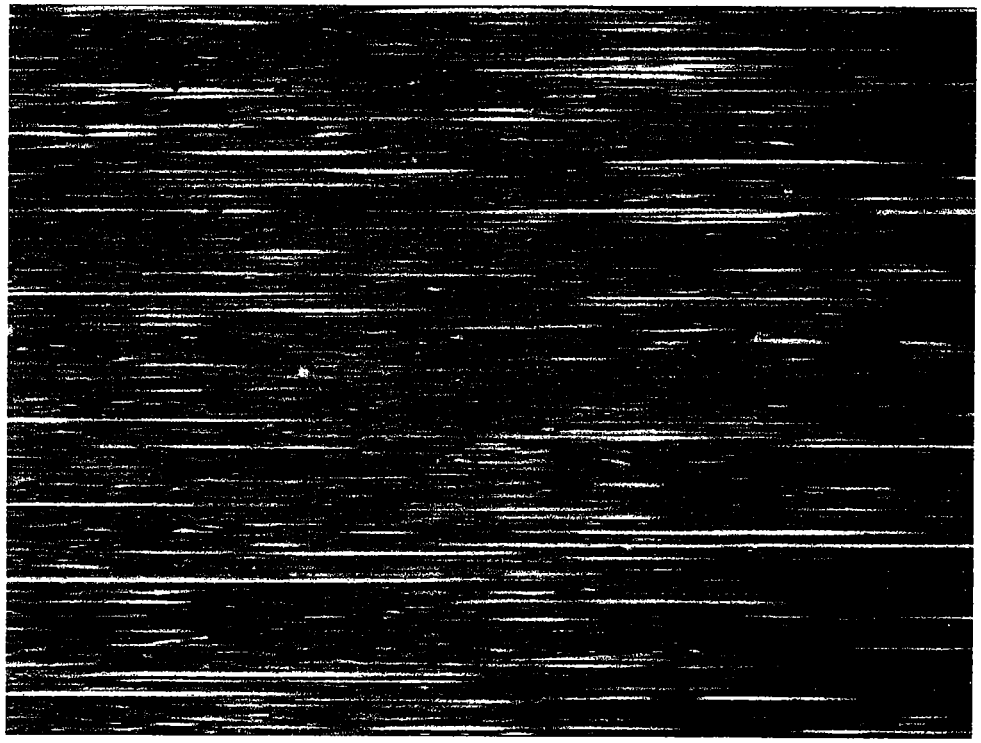
FIG. 13 shows the anisotropic diffusion hologram pattern magnified 200 times.

FIG. 13 shows the anisotropic diffusion hologram pattern magnified 200 times.

As shown in FIG. 12, the hologram is arranged such that diffusion is substantial in the direction between the light sources 2 and smaller in the direction between the reflective entry face 15 and the light sources.

Of light rays 100 that undergo total reflection and are deflected at the V-shaped reflective elements 6 integratedly formed on the exit face 3, a portion thereof that reach the anisotropic diffusion pattern integrated layer 18 are reflected to the reflector 10 side of the light guide plate 1. When a light ray 100 that has undergone total reflection and deflection at the V-shaped reflective elements 6 reaches the anisotropic diffusion pattern integrated layer 18, the angle of total reflection is lost as the anisotropic diffusion pattern integrated layer 18 has a rough face (see FIG. 11), so a part of the light rays are emitted toward the reflector 10 side of the light guide plate 1. When these light rays 100 are emitted from the light guide plate 1, these light rays are anisotropically diffused due to the diffusion characteristics of the hologram, and the light is diffused substantially in the direction between the light sources 2 before reaching the reflector 10.

FIG. 14 is an explanatory drawing illustrating the properties of the master hologram.

FIG. 14(a) is a plan view showing angle dependence of the luminance of light emitted from the points P1, P2, P3 of the anisotropic diffusion pattern integrated layer 18. FIG. 14(b) is a perspective view showing in solid form, the strength distribution of light emitted from the point P2 of the anisotropic diffusion pattern integrated layer 18 of the light guide plate 1.

Due to the effect of the hologram formed on the anisotropic diffusion pattern integrated layer 18, light emitted from the points P1, P2 and P3 of the anisotropic diffusion pattern integrated layer 18 of the light guide plate 1 diffuses substantially in the direction between the light sources 2 as shown by the ellipses E1, E2 and E3, while the light diffuses less in the direction between the reflective entry face 15 and the light sources. The ratio of the longitudinal axial direction and the shorter axial direction of the ellipses E1, E2 and E3 that shows the strength distribution of the diffused light is changeable, but in the case of this embodiment this ratio is 1:60.

Figure 15:
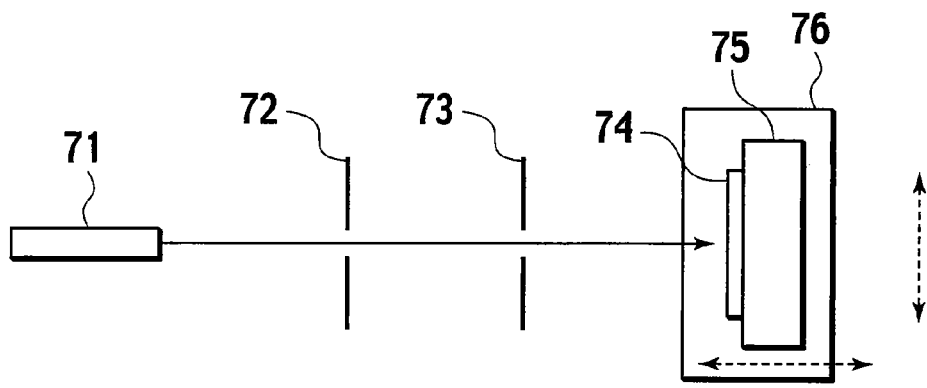
FIG. 15 illustrates the production of the hologram of this embodiment.

FIG. 15 is a block diagram showing the configuration of the device used for forming the master hologram.

The hologram formed by the anisotropic diffusion pattern integrated layer 18, is a copy of a master hologram and has the same optical properties as the master hologram.

The device shown in FIG. 15 has a laser light source 71 for emitting laser light of a determined wavelength, a mask 72 having an opening of for example a rectangular shape, a mask 73 for passing light only of desired regions and a table 75 that supports a photoresist such that a photoresist is movable in the planar direction.

The laser light source 71 can switch between the red, green and blue (RGB) elements of the laser light and emit the light. This is because in order to produce a hologram that diffuses the white light required for illuminating the liquid crystal display device of for example a mobile telephone device, it is necessary to expose each of the RGB elements of the laser light to the photoresist 74. Three laser light sources emit respectively one of the RGB elements, and a switch occurs between these different light sources as the device is used.

The mask 72 has an opening provided by a rectangular shaped diffuser. Frost glass for example can be used for this diffuser. The dimensions of the respective long and short sides of the rectangular shape correspond respectively to the dimensions of the short and long axes of the substantially elliptical speckles formed on the photoresist 74. Note that the relationship between the long and short sides and the short and long axes is a mutual relationship of Fourier transformation.

The mask 73 is used such that light is exposed only to the required regions of the photoresist 74. The hologram according to this embodiment does not expose light at once to all of the photoresist 74, but rather the appropriate parts are exposed so that each part obtains the desired diffusion characteristics. Multiple light exposures are performed repeatedly to each part until the photoresist 74 has been exposed entirely. This multiple light exposure is performed for each of the respective RGB elements. Once the hologram thus exposed to light is developed the master hologram is obtained.

The photoresist 74 is a thick film uniformly distributed with a highly photosensitive body such that extremely weak light can be detected and the speckles faithfully reproduced.

The supporting base 75 is used to move the photoresist 74 in the planar direction. The table 75 changes the position of light exposure to the photoresist 74 and adjusts the distance between the masks 72 and 73, and the photoresist 74 when moving the photoresist 74.

Figure 16:
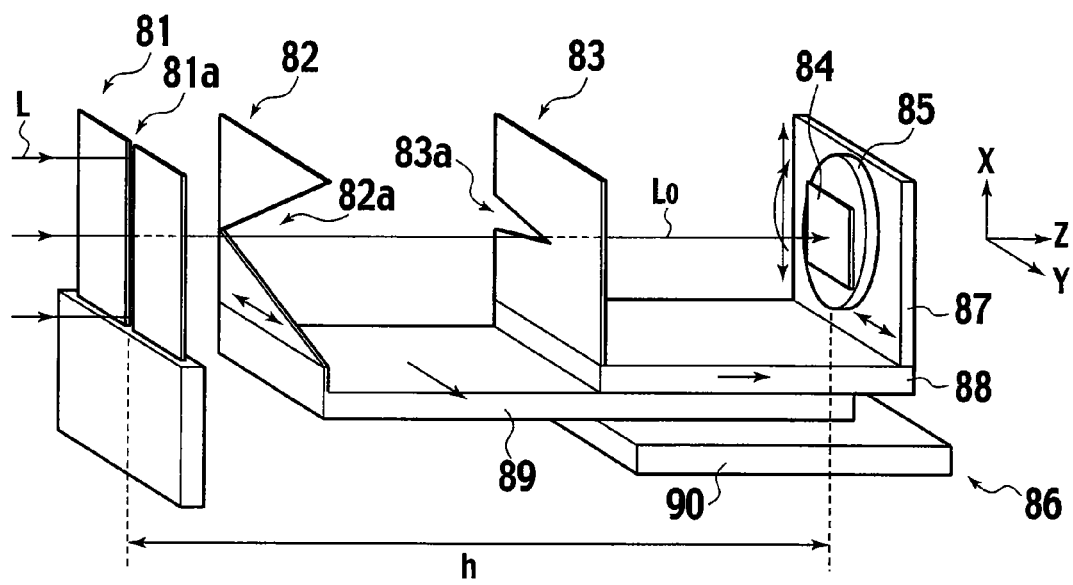
FIG. 16 is a perspective view showing the structure of the device used for producing the master hologram.

FIG. 16 is a perspective view showing the configuration of the device used for forming the master hologram.

The masks 81 and 82 are equivalent to the mask 72 having the rectangular shaped opening shown in FIG. 15. The mask 81 has a slit 81a. The short side of the rectangular shaped opening is determined by the width of this slit. The mask 82 has a triangular shaped opening 82a. The long side of the rectangular shaped opening is determined by the maximum length in the longitudinal direction of the region of the slit 82a of the triangular shaped opening 82 which passes light passing the slit 81a of the mask 81. The masks 81 and 82 diffuse light passed by a diffuser not shown in the drawing.

The mask 83 equates to the mask 73 shown in FIG. 15. This mask 83 has a rectangular shaped opening 83a. The regions of the photoresist 84 that are exposed to light are limited to those parts to which light passing this rectangular shaped opening 83a reach. The entire face of the photoresist 84 can be exposed to light by changing these parts of the photoresist 84 and performing multiple exposures.

A master hologram is obtained when a photoresist is exposed to light using the devices shown in FIG. 15 and FIG. 16 and developed. A master hologram produced in this way is unevenly transferred to parts corresponding to the exit face of the mold used for producing the light guide plate. This mold to which the master hologram has been transferred is then used to produce the light guide plate by injection molding and the hologram can be integratedly formed on the lower face of the light guide plate.

Figure 17:
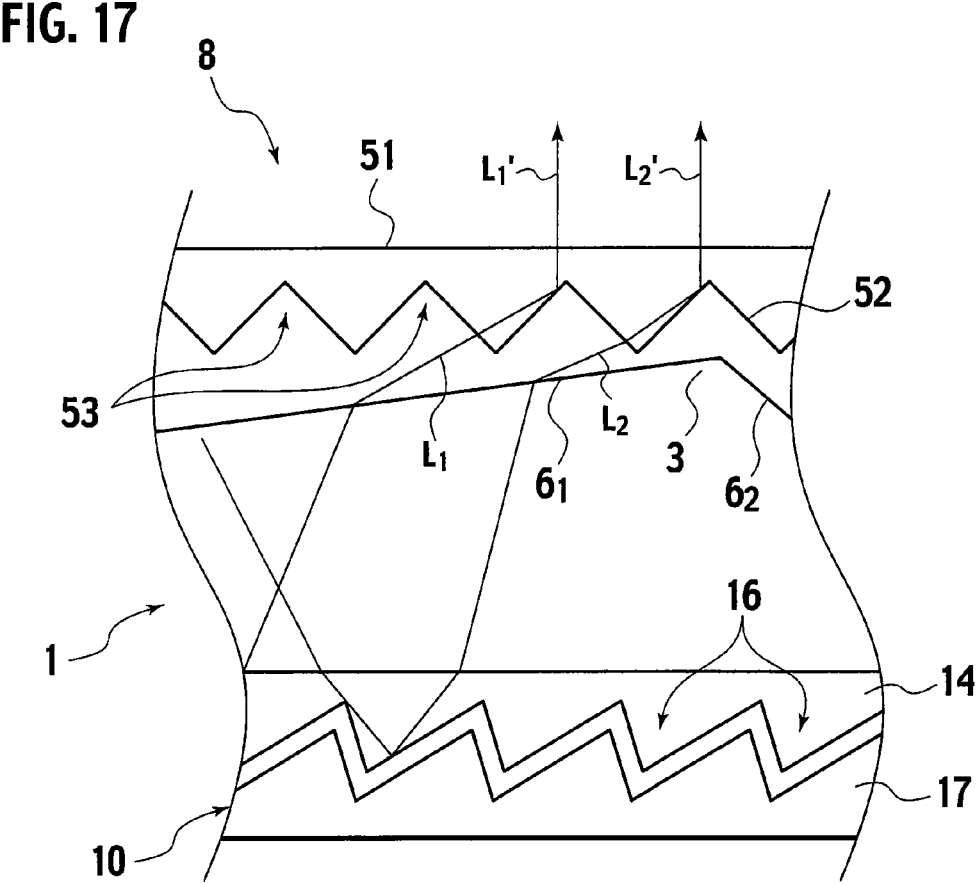
FIG. 17 shows a part of the backlight device formed of the light guide plate and the optical sheet.

FIG. 17 shows a part of the backlight device formed by the light guide plate and optical sheet.

In this backlight device comprising the light guide plate 1 and the optical sheet 8 light emitted from the exit face 3 of the light guide plate 1 includes lights $L_1$ and $L_2$, being light elements which form a small angle with the exit face 3. The optical sheet 8 has a flat upper face 51 and a prism shaped lower face 52. When the lights $L_1$ and $L_2$ that form a small angle with the exit face 3 of the light guide plate 1 enter from this lower face 52, the angle is changed so as to become a substantial angle with the upper face 51 and the lights are emitted ($L_1'$ and $L_2'$). In this way the optical sheet 8 improves the frontal strength of light output to the liquid crystal display elements 7.

Figure 18:
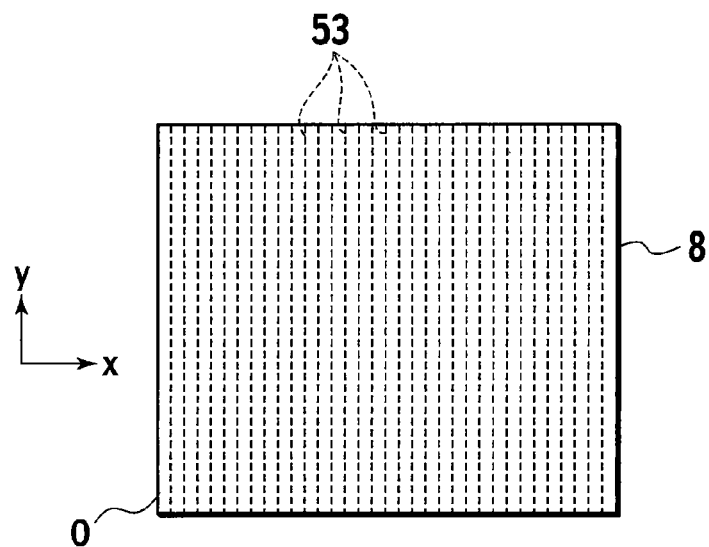
FIG. 18 shows the optical sheet.

FIG. 18 shows the optical sheet.

This optical sheet is made of a transparent material such as for example PMMA, polyolifine, polycarbonate or a photoresistant resin. Reflective grooves 53 that form a continuous prism shaped construction are disposed on the lower face 52 opposing the upper face 51. This optical sheet 8 is disposed above the exit face 3 of the light guide plate 1.

An example of a backlight device applying the present invention will now be described. In the following examples the following configuration is used throughout. This configuration is described with reference to FIG. 8.

Four NSCW335's by Nichia were used for the light sources. The light guide plate 1 was of polycarbonate, the entry face 5 having a length of 40 mm in the planar direction, 50 mm in the perpendicular direction and was of 0.7 mm thickness. The reflective elements 6 were formed with the values for those items shown in FIG. 10 being $\theta1=1.5°$, $\theta2=35°$ and p=150 µm. A hologram pattern, formed by an anisotropic diffusion pattern integrated layer 18 was formed on that face of the light guide plate 1 at the opposite side to that on which the reflective elements 6 were formed, this hologram pattern being formed such that light perpendicularly incident to that surface was diffused in the longitudinal axial direction and shorter axial direction respectively at 60° and 1°. The light guide plate 1 was arranged such that the face at the reflective elements 6 side of the light guide plate 1 opposed the optical sheet 8 and the face at the anisotropic diffusion pattern integrated layer 18 side of the light guide plate 1 opposed the reflector 10.

The optical sheet 8 was a prism film M165 by Mitsubishi Rayon, the prism face being disposed so as to oppose the side of the light guide plate 1. The reflector 10 was provided by a silver deposition of 1000 Å applied to a variety of prism films, disposed such that the crest line direction was orthogonal to the entry face 5.

For this first example, a reflector 10 of the first embodiment as that shown in FIG. 4 having trapezoidal section prism elements formed with no gap therebetween was used, the base angle of the trapezoid being 45° and the ratio of the flat part of the trapezoid being 0.15. Here, the ratio of the flat part means the proportion of a face of one side of the reflector 10 occupied by the area of the flat part. The luminance of the backlight device according to this first example was 2290 (cd/m$^2$), and when observed from the upper surface of the optical sheet 8, there was no bright line in the region of the entry face 5 of the light guide plate 1.

For the second example, a reflector 10 of the first embodiment as that shown in FIG. 4 having trapezoidal section prism elements formed with no gap therebetween was used, the base angle of the trapezoid being 45° and the ratio of the flat part of the trapezoid being 0.11. The luminance of the backlight device according to this second example was 2225 (cd/M$^2$), and when observed from the upper surface of the optical sheet 8, there was no bright line in the region of the entry face 5 of the light guide plate 1.

For the third example, a reflector 10 of a second embodiment as that shown in FIG. 5 having an iteration of trapezoidal section prism elements formed with gaps between the elements was used, the base angle of the trapezoid being 45° and the ratio of the flat part of the trapezoid being 0.24. The luminance of the backlight device according to this third example was 2320 (cd/M$^2$), and when observed from the upper surface of the optical sheet 8, there was no bright line in the region of the entry face 5 of the light guide plate 1.

For the fourth example, a reflector 10 of the second embodiment as that shown in FIG. 5 having an iteration of trapezoidal section prism elements formed with gaps therebetween was used, the base angle of the trapezoid being 45° and the ratio of the flat part of the trapezoid being 0.41. The luminance of the backlight device according to this fourth example was 2350 (cd/m$^2$)), and when observed from the upper surface of the optical sheet 8, there were subtle blight lines in the region of the entry face 5 of the light guide plate 1.

Comparative examples will now be provided for the purpose of providing a contrast to the above described backlight device embodiments. In these examples the same configuration is used as that described with respect to the above examples unless specifically stated otherwise.

The first comparative example employs the reflector 10 according to the first embodiment as that shown in FIG. 4, having trapezoidal section prism elements formed with no gap therebetween, the base angle of the trapezoid being 45° and the ratio of the flat part of the trapezoid being 0. The luminance of this backlight device of this first comparative example was 2100 (cd/m$^2$), and when observed from the upper surface of the optical sheet 8, there was no bright line in the region of the entry face 5 of the light guide plate 1.

For the second comparative example, a reflector 10 of the first embodiment as that shown in FIG. 4 having trapezoidal section prism elements formed with no gap therebetween was used, the base angle of the trapezoid being 27° and the ratio of the flat part of the trapezoid being 0.30. The luminance of the backlight device according to this second comparative example was 2182 (cd/m$^2$), and when observed from the upper surface of the optical sheet 8, there were bright lines in the region of the entry face 5 of the light guide plate 1.

For the third comparative example a mirror surface shape reflector 10 was used. The luminance of the backlight device according to this third comparative example was 2360 (cd/m$^2$), and when observed from the upper surface of the optical sheet 8, darkness between the light sources and clear bright lines were observed in the region of the entry face 5 of the light guide plate 1.

Table 1 brings together the results of the above described embodiments and the comparative examples.

| | Reflector Form | Base Angle of Trapezoid | Ratio of Flat Part | Appearance of Entry Part | Luminance (cd/m$^2$) |
|---|---|---|---|---|---|
| Example 1 | First Embodiment (FIG. 4) | 45° | 0.15 | ◎ | 2290 |
| Example 2 | First Embodiment (FIG. 4) | 45° | 0.11 | ◎ | 2225 |
| Example 3 | Second Embodiment (FIG. 5) | 45° | 0.24 | ◎ | 2320 |

-continued

| | Reflector Form | Base Angle of Trapezoid | Ratio of Flat Part | Appearance of Entry Part | Luminance (cd/m²) |
|---|---|---|---|---|---|
| Example 4 | Second Embodiment (FIG. 5) | 45° | 0.41 | ○ | 2350 |
| Comparative Example 1 | First Embodiment (FIG. 4) | 45° | 0 | ◎ | 2100 |
| Comparative Example 2 | First Embodiment (FIG. 4) | 27° | 0.30 | Δ | 2182 |
| Comparative Example 3 | Mirror Surface | — | — | X | 2360 |

Appearance of Entry Part
◎: No bright line
○: Subtle bright lines
Δ: Bright lines
X: Clear bright lines and darkness between light sources Although the invention has been described herein by reference to an exemplary embodiment, the invention is not limited thereby, and modifications and variations of the embodiment as described will occur to those skilled in the art, in light of the above teachings. Further, the particular values provided in the above description are intended to provide examples that are illustrative with respect to the invention and not restrictive.

The invention claimed is:

1. A backlight device comprising:
   (a) a light guide plate that propagates, reflects and diffuses light, disposed at a rear surface side of a display device, wherein the light guide plate comprises
      (i) an entry face that light enters at one side of the light guide plate;
      (ii) an exit face disposed on a side of the light guide plate adjacent to a liquid crystal display device; and
      (iii) a lower face disposed opposing the side of the light guide plate nearest to the liquid crystal display device;
   (b) a light source disposed at least one end of the light guide plate; and
   (c) a reflector that comprises a structured face that includes an iteration of prism elements of trapezoidal section, a crest line direction of the prism elements being disposed orthogonally to the entry face of the light guide plate, wherein the reflector is disposed at the lower face of the light guide plate and reflects light from the light guide plate at the structured face.

2. The backlight device according to claim 1, wherein the light guide plate has reflective elements integratedly formed on the exit face, and the light guide plate emits light rays, by means of the reflective elements, in the direction of the reflector adjacent to the lower face of the light guide plate.

3. The backlight device according to claim 2, wherein an anisotropic diffusion pattern is formed on the lower face of the light guide plate.

4. The backlight device according to claim 2, wherein the reflective elements comprise V-shaped grooves, wherein an inclined face of the grooves is directed to face light sources so that an angle of inclination of the inclined face brings light from the entry face gradually to a first angle below a second angle for total internal reflection.

5. The backlight device according to claim 2, wherein a rate of reflectivity of the reflector is not less than 75%, and a repetition cycle of the prism elements is 1-200 µm, and an angle formed by an oblique side of the trapezoidal section and a base thereof is 20-70° and a ratio of the sum of a length of an upper side of the trapezoidal section and a length of a gap between prism elements is a ratio in the range of 0.05-0.5 in relation to the repetition cycle of the prism elements.

6. The backlight device according to claim 3, wherein the reflective elements comprise V-shaped grooves, wherein an inclined face of the grooves is directed to face light sources so that an angle of inclination of the inclined face brings light from the entry face gradually to a first angle below a second angle for total internal reflection.

7. The backlight device according to claim 3, wherein a rate of reflectivity of the reflector is not less than 75%, and a repetition cycle of the prism elements is 1-200 µm, and an angle formed by an oblique side of the trapezoidal section and a base thereof is 20-70° and a ratio of the sum of a length of an upper side of the trapezoidal section and a length of a gap between prism elements is a ratio in the range of 0.05-0.5 in relation to the repetition cycle of the prism elements.

8. The backlight device according to claim 6, wherein a rate of reflectivity of the reflector is not less than 75%, and a repetition cycle of the prism elements is 1-200 µm, and an angle formed by an oblique side of the trapezoidal section and a base thereof is 20-70° and a ratio of the sum of a length of an upper side of the trapezoidal section and a length of a gap between prism elements is a ratio in the range of 0.05-0.5 in relation to the repetition cycle of the prism elements.

9. The backlight device according to claim 4, wherein a rate of reflectivity of the reflector is not less than 75%, and a repetition cycle of the prism elements is 1-200 µm, and an angle formed by an oblique side of the trapezoidal section and a base thereof is 20-70° and a ratio of the sum of a length of an upper side of the trapezoidal section and a length of a gap between prism elements is a ratio in the range of 0.05-0.5 in relation to the repetition cycle of the prism elements.

10. The backlight device according to claim 1, wherein an anisotropic diffusion pattern is formed on the lower face of the light guide plate.

11. The backlight device according to claim 1, wherein a rate of reflectivity of the reflector is not less than 75%, and a repetition cycle of the prism elements is 1-200 µm, and an angle formed by an oblique side of the trapezoidal section and a base thereof is 20-70° and a ratio of the sum of a length of an upper side of the trapezoidal section and a length of a gap between prism elements is a ratio in the range of 0.05-0.5 in relation to the repetition cycle of the prism elements.

12. The backlight device according to claim 10, wherein a rate of reflectivity of the reflector is not less than 75%, and a repetition cycle of the prism elements is 1-200 µm, and an angle formed by an oblique side of the trapezoidal section and a base thereof is 20-70° and a ratio of the sum of a length of an upper side of the trapezoidal section and a length of a gap between prism elements is a ratio in the range of 0.05-0.5 in relation to the repetition cycle of the prism elements.

13. The backlight device according to claim 1, wherein a height of the trapezoidal section of prism elements is constant.

14. The backlight device according to claim 1, wherein a height of the trapezoidal section of prism elements is progressively decreasing.

15. The backlight device according to claim 1, further comprising:
    (d) an optical sheet disposed above the exit face of the light guide plate, wherein the optical sheet has a flat upper face and a lower face, and wherein reflective grooves forming a continuous prism-shaped construction are disposed on the lower face of the optical sheet.

16. The backlight device according to claim 1, wherein the prism elements comprise a variety of prism films.

\* \* \* \* \*